No. 689,855. Patented Dec. 31, 1901.
J. S. COPELAND.
CLAMPING DEVICE.
(Application filed Oct. 29, 1898.)
(No Model.)
Fig.1
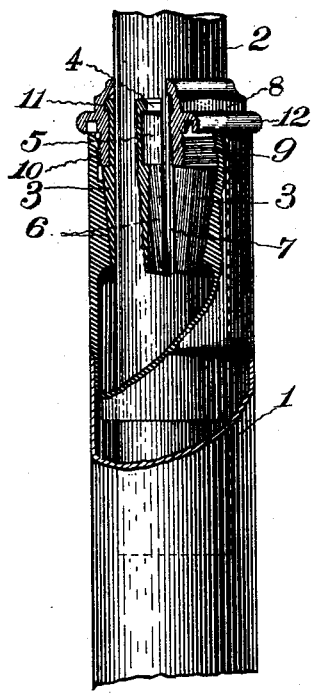
Fig.2
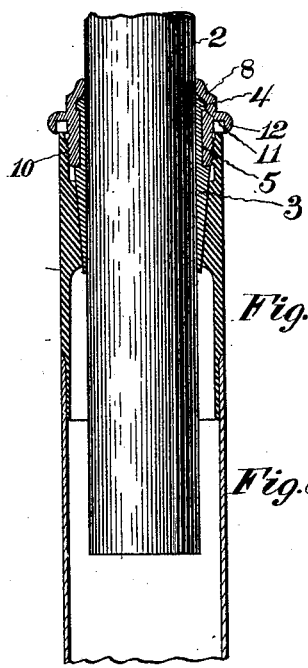
Fig.3
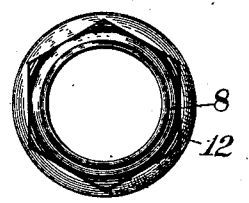
Fig.4
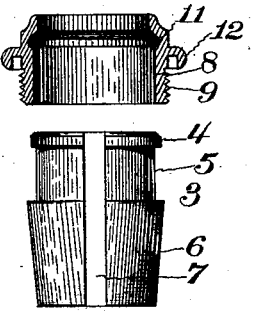
Fig.5
Fig.6
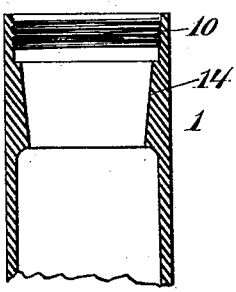
Fig.7
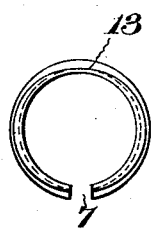
Witnesses:
William H. Barker
Emma P. Coffin
Inventor:
James S. Copeland
By Chas. L. Burdett,
Attorney
THE NORRIS PETERS CO., PHOTO-LITHO., WASHINGTON, D. C.

UNITED STATES PATENT OFFICE.

JAMES S. COPELAND, OF HARTFORD, CONNECTICUT, ASSIGNOR TO AMERICAN BICYCLE COMPANY, OF JERSEY CITY, NEW JERSEY, AND NEW YORK, N. Y., A CORPORATION OF NEW JERSEY.

CLAMPING DEVICE.

SPECIFICATION forming part of Letters Patent No. 689,855, dated December 31, 1901.

Application filed October 29, 1898. Serial No. 694,900. (No model.)

*To all whom it may concern:*

Be it known that I, JAMES S. COPELAND, a citizen of the United States, and a resident of Hartford, in the county of Hartford and State of Connecticut, have invented certain new and useful Improvements in Clamping Devices, of which the following is a full, clear, and exact description, whereby any one skilled in the art can make and use the same.

My invention relates to that class of clamping devices used primarily for clamping telescoping cylindrical parts, and is particularly applicable for securing the seat-post or handle-bar shaft of a bicycle; and the object of my invention is to provide a device of this class in which the separate operative parts shall be reduced to a minimum with the attending advantages and also one that shall be free from any protruding parts, self-releasing, absence of sticking of parts, and one in which the completed device shall present a neat and finished appearance.

To this end my invention consists in the clamp as a whole, in the combination of parts, and in the details and their combination, as hereinafter described, and more particularly pointed out in the claim.

Referring to the drawings, Figure 1 is a detail side view of one of the frame-tubes of a bicycle, showing my improvement attached thereto and with parts broken away to show construction. Fig. 2 is a detail view, in central vertical section, through the same. Fig. 3 is an end view of the nut. Fig. 4 is a detail view in section through the same. Fig. 5 is a side view of the sleeve. Fig. 6 is a view in central vertical section through the frame member. Fig. 7 is an end view of the sleeve.

While the device may be applied to clamping a handle-bar shaft, seat-post, or other part of a vehicle, I have shown and described the invention herein as relating to a seat-post, and in the accompanying drawings the numeral 1 indicates a tube member of a bicycle, and 2 the seat-post, extending downward within the tube member. A sleeve 3 surrounds the post 2 and includes a collar 4, a reduced portion 5, and a tapered portion 6. The sleeve is split, as at 7, for the purpose of expansion or contraction. A nut 8 is screw-threaded at 9 to fit the screw-threaded surface 10 of the tube member 1, and the nut also has a recess 11 for the reception of the collar 4. The nut may be provided with any ordinary means for turning it to place, in the form shown it being provided with many sides for the reception of a wrench. The nut has also a flange 12, adapted to overlie and embrace the end of the tube 1.

In order to provide for the assembling of the parts, the shoulder at the top of the sleeve is cut away diametrically opposite the slit or immediately adjacent to the slit on both sides or both opposite to and adjacent to the slit, thus reducing the diameter between these points, after compression in an opposite direction, to an extent to permit the ready insertion of the shoulder into the nut or collar.

In the operation of the device the sleeve is contracted and inserted in the nut 8, the collar 4 being located in the recess 11, the sleeve expanding to accomplish this result. The thread 9 on the nut is engaged with the thread 10 on the tube member, and the seat-post 2 being in place the nut is screwed down, as by means of a wrench, the tapered portion 6 coming in contact with the tapered portion 14 of the tube and contracting the sleeve about the post that is tightly gripped and held in position.

It is to be particularly noted that the clamp device proper consists of two parts only, exclusive of the parts to be clamped together, and these two parts are so attached as to form practically a single member, so far as loss of either of the parts is concerned, and the release of the clamp from the seat-post is automatic upon unscrewing the nut 8.

Thus it will be seen that my improved clamp embodies a minimum number of parts, which parts for all practical purposes are so mutually attached as to prevent their being lost or inoperatively positioned and simplifies the construction and materially reduces the cost of manufacture. The action is positive both in clamping and unclamping the parts, the sleeve being surely released from its wedging action by a rotation of the nut and does not require unnecessary tapping or jar to release it from its hold after the nut has been loosened, as is required in prior devices of this class, the sticking of the parts being absolutely prevented by the peculiar construction herein described.

I do not limit myself to the precise construction herein shown, as it is obvious that other forms of devices for accomplishing the same result may be employed without anything more than a mere reversal of parts or the employment of more than mere mechanical skill.

I claim as my invention—

The combination in a clamping device of a split sleeve having a beveled surface and a groove for the reception of a nut and also a cut-away portion on one side of a collar partially forming the groove, the collar formed on one side of the groove, a nut formed to engage the groove in the sleeve, and telescoping parts one having screw-threads engaged by the screw-threads on the nut and a beveled surface to coact with the beveled surface on the sleeve.

JAMES S. COPELAND.

Witnesses:
LUDWIG M. DIETERICH, Jr.,
HERMANN F. CUNTZ.